May 26, 1925.
N. C. CHRISTENSEN
PROCESS OF TREATING ORES CONTAINING GALENA
Filed Sept. 30. 1919
1,539,711
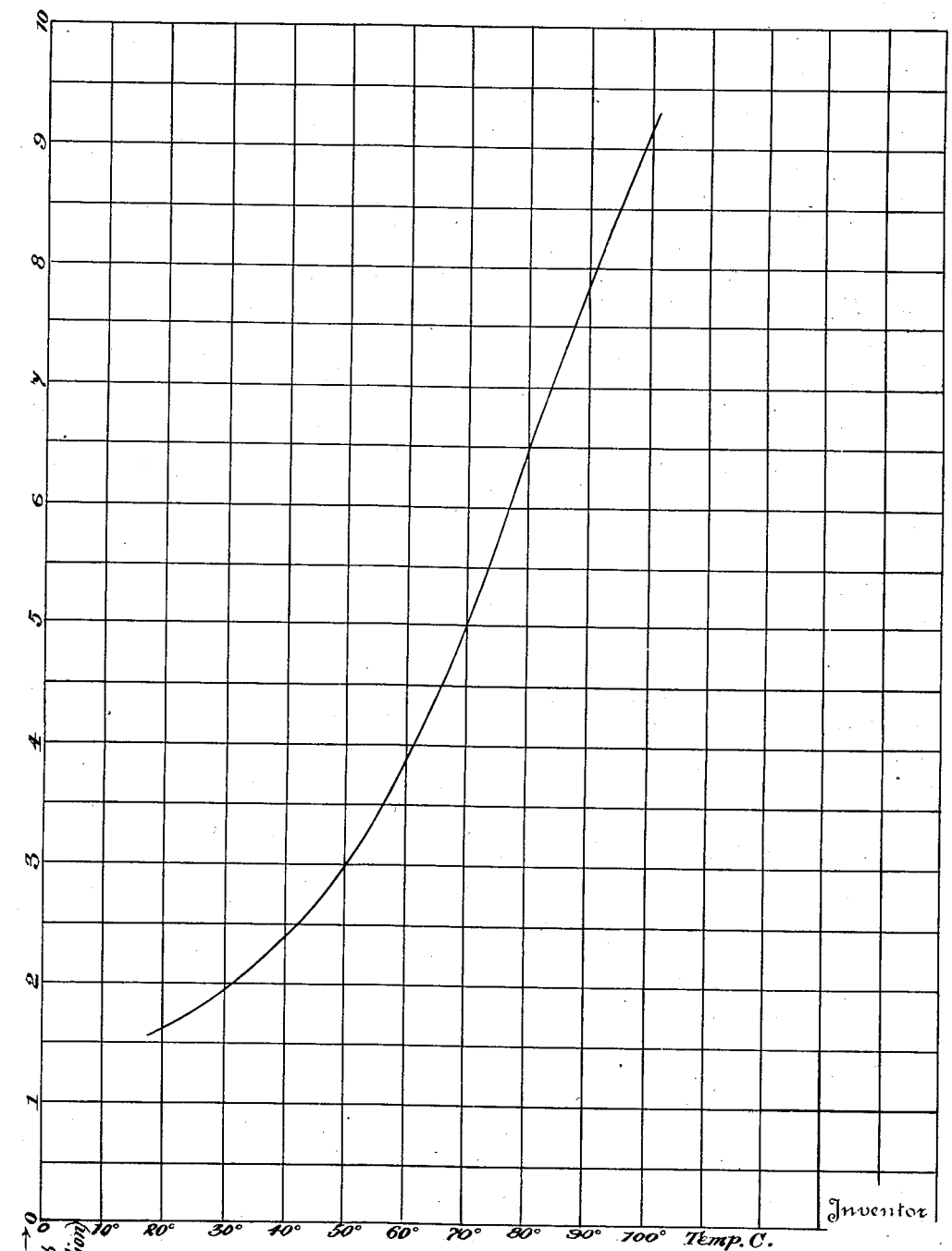

Patented May 26, 1925.

1,539,711

UNITED STATES PATENT OFFICE.

NIELS C. CHRISTENSEN, OF SALT LAKE CITY, UTAH.

PROCESS OF TREATING ORES CONTAINING GALENA.

Application filed September 30, 1919. Serial No. 327,400.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Ores Containing Galena, of which the following is a specification.

This invention relates to the treatment of ores containing galena for the recovery of the lead and silver therefrom. My process is applicable to all galena ores which do not contain too much material which is readily soluble in acid. It recovers practically all the lead in a clean product and practically all the silver in the galena and also the silver in the ore in the form of sulphide or antimonide. The sulphur combined with the lead is also recovered in a form which is readily handled. The process is hydrometallurgical but the products may be treated by pyrometallurgical methods if desired.

My process consists in treating the finely ground ore with a concentrated salt solution containing a little excess of acid over the amount necessary to combine with the lead to form lead chloride or lead sulphate. Either sulphuric or hydrochloric acid may be used. The latter is somewhat preferable, but sulphuric will be used in most cases as it is so much cheaper and more easily handled.

It is well known that hot concentrated hydrochloric acid will dissolve galena and that the hot acid will hold considerably more lead chloride in solution than the cold acid and there are several old processes for making lead chloride by dissolving galena in hot concentrated hydrochloric acid and separating the lead chloride by cooling. The processes have never come into commercial use, however, on account of the great difficulty of handling concentrated hydrochloric acid. It is also known that galena may be converted into lead sulphate by treatment with hot concentrated sulphuric acid or into lead chloride by treatment with concentrated hydrochloric acid, and that the lead sulphate or lead chlorides may be separated from the gangue material by dissolving the lead sulphate or chloride in hot brine and precipitating lead chloride therefrom by cooling the concentrated lead solution. The difficulty of handling the concentrated acids and the large loss of acid in these processes have, however, prevented their use in commercial operations. By my process I overcome the difficulties encountered in these older processes by avoiding the use of concentrated acids and by doing away with the double treatment of the ore in which it is first chloridized or sulphated in one operation and thereafter separated from the gangue in another separate dissolving operation. In my process I use comparatively dilute acid solutions and dissolve the galena (and silver sulphide) directly in an acid brine solution in a single operation, doing away entirely with the use of concentrated acid or the preliminary chloridizing or sulphatizing treatment. The discovery which I have made, and which is the basis of my process, i. e., that a hot concentrated salt solution containing acid, in slight excess over the amount theoretically necessary to form lead chloride or sulphate from the galena added to the solution, will rapidly dissolve galena and silver sulphide, is so contradictory to present ideas as to the solubility of lead and silver sulphides as to be revolutionary, and my process is so simple as compared with the older complicated methods of sulphatizing and chloridizing galena so as to make it soluble in concentrated brine, as to constitute a great improvement in the treatment of these ores.

I have found that a concentrated salt solution containing a small amount of acid dissolves galena, the lead going into solution as a chloride and $H_2S$ being given off, and the silver in the galena, and in argentite and other silver minerals which contain no arsenic also goes into solution. The cold solution acts very slowly and holds but a relatively small amount of lead in solution. The speed of the reaction is, however, greatly increased by thorough agitation of the pulp so as to remove the $H_2S$ as it is formed. The hot solution acts very rapidly and requires but a very short time to bring the lead and silver into solution and holds a large amount of lead in solution. The lead of the galena goes into solution as a chloride and the sulphur is driven off in the form $H_2S$ and may be collected and treated for the recovery of the sulphur.

The curve on Plate I gives the amount of lead held according to my tests in a practically saturated brine containing a small amount of $H_2SO_4$, the percentage being given as volume per cents, i. e. the density of the solution is taken as 1 so that the figure gives the weight in centigrams of the lead in a cubic centimeter of solution. The solubility of the lead chloride or sulphate is slightly greater when no sulphate is present and is slightly decreased if more sulphate is present. The curve shows that the increase in solubility is almost directly proportional to the rise in temperature, above 50° being about 1% for each 8° rise in temperature (C). Below 50° the difference in solubility per degree change in temperature is less the lower the temperature. The curve shows clearly the great difference in the amount of lead held in solution in the hot and cold solutions.

My preferred method of separating the lead from the solution is to take advantage of this great difference in solubility between the hot and cold solution, the galena being dissolved in a hot solution so as to give a concentrated lead chloride solution when hot, this hot solution is then separated from the ore and cooled and the precipitated lead chloride separated from the cold solution which is again used for the treatment of more ore so that the lead which is still carried in solution is not lost.

With the cold solution other methods of precipitation such as by electrolysis with iron anodes and with lime may be used.

My preferred method of carrying out my process is to agitate the finely ground ore (or concentrate) with a hot concentrated salt solution carrying a little excess of acid (sulphuric or hydrochloric) over the amount necessary to combine with the lead. I prefer to use such a proportion of solution to lead in the ore that I secure a relatively concentrated hot lead solution. The hot solution is then separated from the ore, preferably by filtration or by decantation and filtration if a large volume of solution must be used. The silver in this hot pregnant solution is then precipitated out preferably with metallic lead (or, if desired, upon copper or iron) either in the form of sponge or shavings. If no silver is present this step is omitted or the silver may be precipitated from the cooled solution if desired. The solution is then cooled and the precipitated lead chloride separated from the cold solution which is used in treating more ore. The lead remaining in the cold solution may be precipitated by the addition of lime so as to secure a barren solution for washing the ore. This precipitate may be retreated with the ore.

The precipitated lead chloride is then smelted with lime or finely ground limestone and the required amount of reducing agent giving a pure lead bullion and calcium chloride, the reactions being as indicated below:

$$PbCl_2 + Ca``O" + C = Pb + CaCl_2 + CO$$

The calcium chloride thus formed is used to precipitate the sulphates from the solution by adding it to the pulp during treatment so that the calcium sulphate formed as indicated below remains with the pulp.

$$``M"SO_4 + CaCl_2 = ``M"Cl_2 + CaSO_4.$$

If any considerable amount of iron salts accumulates in the solution the percentage of lead which the solution will carry is decreased. These iron salts are best removed by adding some finely ground limestone to the hot pulp after all the lead is in solution. By this means the iron is precipitated in the pulp as indicated below:

$$2FeCl_3 + 3CaCO_3 + 3H_2O = 2Fe(OH)_3 + 3CaCl_2 + 3CO_2$$
$$FeCl_2 + CaCO_3 + H_2O = Fe(OH)_2 + CaCl_2 + CO_2$$
$$FeSO_4 + CaCO_3 + H_2O = Fe(OH)_2 + CaSO_4 + CO_2$$

The precipitation of the ferrous salts is expedited and made more efficient by passing air through the hot pulp and thus oxidizing the ferrous hydroxide to ferric hydroxide. The sulphate combined with the iron is also precipitated as indicated.

The separated lead chloride is very pure and may be used to great advantage for the manufacture of other lead compounds which makes this process for the manufacture of lead chloride of great value. The lead chloride may also be melted and electrolyzed, or may be treated with metallic iron for the recovery of the lead.

If it is preferred to use cold solutions the lead must be precipitated with lime or by electrolysis with iron anodes. The removal of the iron salts and sulphates is carried out as above indicated with finely ground limestone, though the reactions take place much more slowly.

The $H_2S$ generated in the process is easily recovered, especially from the hot treatment and may be utilized for the recovery of the sulphur or for other purposes.

The fineness of grinding, amount of acid necessary and time of treatment will vary with the character of the ore and the lead content. All the ores I have tested with the hot acid solution have given complete extractions of the lead with a treatment of fifteen minutes or less and with the amount of acid but slightly in excess of the amount theoretically necessary to combine with the lead plus the amount necessary to dissolve any readily soluble material such as calcite and other soluble oxidized minerals or such as a small portion of the zinc in mixed lead-zinc sulphide ores.

From the foregoing it will be apparent that my process is an extremely cheap and efficient process for the treatment of ores containing galena, a process which has a multitude of advantages over the ordinary methods of concentration and smelting now in general use. Not only is my process much more simple and less expensive, but the recoveries are much higher being practically one hundred per cent.

As many minor changes may be made in the practical application of my process, I do not wish to be limited entirely by the foregoing brief description but by the appended claims.

Having described my process, what I claim and desire to patent is:

1. The process of treating ores containing galena which consists in lixiviating said ores with a concentrated solution of sodium chloride containing acid and thereby dissolving the lead from said galena in said salt solution.

2. The process of treating ores containing galena which consists in agitating the finely ground ore with a concentrated salt solution containing acid and thereby dissolving the lead in said galena in said salt solution.

3. The process of treating ores containing galena which consists in agitating said ores with a hot concentrated solution of sodium chloride containing a relatively small percentage of acid and thereby dissolving the lead in said galena in said hot salt solution.

4. The process of treating ores containing galena which consists in lixiviating said ores with a hot concentrated solution of sodium chloride containing acid and thereby dissolving the lead in said galena in said hot salt solution.

5. The process of treating ores containing galena which consists in agitating the finely ground ore with a hot concentrated salt solution containing acid and thereby dissolving the lead in said galena in said hot salt solution.

6. The process of treating ores containing galena which consists in agitating said ores with a hot concentrated solution of sodium chloride containing a relatively small percentage of acid and thereby dissolving the lead in said galena in said hot salt solution.

7. The process of treating ores containing galena which consists in lixiviating said ores with a hot concentrated solution of sodium chloride containing acid and thereby dissolving the lead in said galena in said hot salt solution, and separating said hot salt solution containing said lead from the ore and cooling said salt solution thereby precipitating lead from said solution as a chloride 8. The process of treating ores containing galena which consists in agitating the finely ground ore with a hot concentrated solution of sodium chloride containing acid and thereby dissolving the lead in said galena in said hot salt solution, and separating said hot salt solution containing said lead from the residue of ore and cooling said salt solution, thereby precipitating lead from said solution as a chloride.

9. The process of treating ores containing galena which consists in agitating said ores with a hot concentrated salt solution containing a relatively small percentage of acid and thereby dissolving the lead from said galena in said hot salt solution, and separating said hot salt solution containing said lead from the ore and cooling said solution and precipitating lead therefrom as a chloride.

10. The process of treating ores containing galena which consists in lixiviating said ores with a hot concentrated solution of sodium chloride containing acid and thereby dissolving the lead in said galena in said hot salt solution, and separating said hot salt solution containing said lead from the ore and cooling said salt solution thereby precipitating lead from said solution as a chloride, and separating said precipitated lead chloride from the cooled salt solution, and smelting said lead chloride with limestone to secure metallic lead and calcium chloride, and using said calcium chloride to precipitate the sulphates from the salt solution used in the treatment of more ore.

11. The process of treating ores containing galena which consists in lixiviating said ores with a hot concentrated solution of sodium chloride containing acid and thereby dissolving the lead in said galena in said hot salt solution, and separating said hot salt solution containing said lead from the ore and cooling said salt solution thereby precipitating lead from said solution as a chloride, and separating said precipitated lead chloride from the cooled salt solution, and smelting said lead chloride with lime to secure metallic lead and calcium chloride, and using said calcium chloride to precipitate the sulphates from the salt solution used in the treatment of more ore.

12. The process of treating ores containing galena which consists in lixiviating said ores with a hot concentrated solution of sodium chloride containing acid and thereby dissolving the lead in said galena in said hot salt solution, and separating said hot salt solution containing said lead from the ore and cooling said salt solution thereby precipitating lead from said solution as a chloride, and separating said precipitated lead chloride from the cooled salt solution, and using said cooled salt solution in the treatment of more ore.

13. The process of treating ores containing galena which consists in lixiviating said ores with a hot concentrated solution of sodium chloride containing acid and thereby dissolving the lead and silver in said galena in said hot salt solution and separating said hot salt solution containing said lead and silver from the remainder of the ore and precipitating the silver from said hot solution and then cooling said solution and precipitating lead chloride from said solution.

14. The process of treating ores containing galena which consists in lixiviating said ores with a hot concentrated solution of sodium chloride and thereby dissolving the lead and silver in said galena in said hot salt solution and separating said hot salt solution containing said lead and silver from the residue of ore and precipitating the silver from said solution with metallic lead and then cooling said solution and precipitating the lead from said solution as a chloride.

15. The process of making lead chloride from galena which consists in treating galena with a hot relatively concentrated solution of sodium chloride containing acid and thereby bringing the lead into solution, and thereafter cooling said solution and thereby precipitating lead chloride from said solution.

16. The process of making lead chloride from galena which consists in agitating the finely divided galena with a hot concentrated solution of sodium chloride containing acid and thereby bringing the lead into solution, and thereafter cooling said solution and thereby precipitating lead chloride therefrom.

17. The process of making lead chloride from galena which consists in treating ores containing galena with a hot concentrated solution of sodium chloride containing acid and thereby bringing the lead into solution, and separating the hot solution containing said lead from the remainder of the ore, and thereafter cooling said solution and precipitating lead chloride therefrom.

In testimony whereof I have signed my name to this specification.

NIELS C. CHRISTENSEN.